Figure 1:
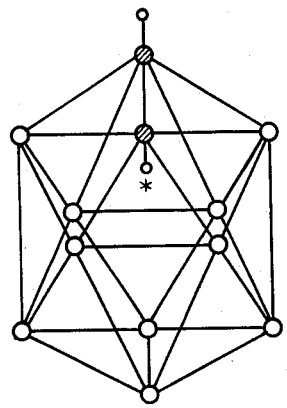

June 28, 1966  J. W. AGER, JR  3,258,487
ORGANOBORON ANILIDES
Filed Jan. 30, 1963

○ BORON

⊘ CARBON

∘ HYDROGEN
(HYDROGEN ATOMS ON BORON
OMITTED FOR CLARITY)

Formula - I

INVENTOR.
JOHN W. AGER Jr.
BY Walter D. Hunter
AGENT

United States Patent Office 3,258,487
Patented June 28, 1966

3,258,487
ORGANOBORON ANILIDES
John W. Ager, Jr., Princeton, N.J., assignor to Olin Mathieson Chemical Corporation, a corporation of Virginia
Filed Jan. 30, 1963, Ser. No. 255,728
2 Claims. (Cl. 260—562)

This invention relates to novel organoboron anilides and to their preparation. More particularly, this invention relates to the preparation of organoboron anilides by reaction of an organoboron monocarboxylic acid halide of the formula $RR'B_{10}H_8[C(H)C(COX)]$, wherein R and R' are each hydrogen or an alkyl group containing from 1 to 5 carbon atoms and X is chlorine or bromine, with aniline.

Organoboron monocarboxylic acid halides are prepared by the reaction of an inorganic acid halide with an organoboron monocarboxylic acid of the class $$RR'B_{10}H_8[C(H)C(COOH)]$$

wherein R and R' are each hydrogen or an alkyl group containing from 1 to 5 carbon atoms as described in Ager and Reid application Serial No. 851,470, filed November 6, 1959, now U.S. Patent 3,102,138. For example, the compound $B_{10}H_{10}[C(H)C(COCl)]$ can be prepared by reacting $B_{10}H_{10}[C(H)C(COOH)]$ with phosphorus pentachloride.

Organoboron monocarboxylic acids suitable for use in the preparation of the above class of organoboron monocarboxylic halides can be prepared, for example, according to the methods described in copending applications Serial No. 809,569, filed April 28, 1959 of John W. Ager, Jr., Roy P. Alexander and Theodore L. Heying, now U.S. Patent 3,167,584, and in Serial No. 812,066, filed May 8, 1959, of John W. Ager, Jr., Roy P. Alexander and Theodore L. Heying, now abandoned.

The solid products prepared in accordance with the method of this invention, when incorporated with suitable oxidizers, such as ammonium perchlorate, potassium perchlorate, sodium percholrate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention, it was discovered that organoboron anilides can be prepared by reacting an organoboron monocarboxylic acid halide of the formula $RR'B_{10}H_8[C(H)C(COX)]$, wherein R and R' are each hydrogen or alkyl group containing from 1 to 5 carbon atoms and X is chlorine or bromine with aniline.

The reaction proceeds according to the following equation:

$RR'B_{10}H_8[C(H)C(COX)] + NH_2$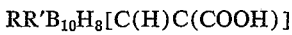 ⟶

$RR'B_{10}H_8$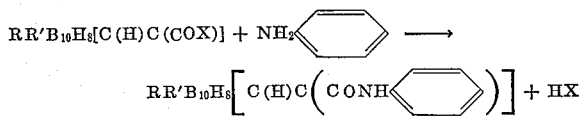 $+ HX$ where R, R' and X have the same meaning as previously defined. Advantageously the reaction is carried out in the presence of an inert organic solvent which can be, for example, a lower dialkyl ether of the type exemplified by methyl ethyl ether, diethyl ether, isopropyl ether,
amyl ether, etc. Generally ethers having not more than 5 carbon atoms in the alkyl group will be employed.

In the process of this invention the reaction temperature can be varied widely from about 0° C. to about 75° C. and preferably is maintained at about 0° C. and 25° C. With the lower boiling ethers the reaction can be conveniently carried out at reflux temperature. In the process of this invention the ratio of the reactants can very considerably. Generally, from about 0.5 to about 10 moles of aniline will be employed per mole of the organoboron monocarboxylic acid halide charged to the reactor and preferably from about 1 to about 4 moles of aniline will be utilized per mole of the acid halide introduced.

The process of the present invention is illustrated in detail by the following examples which are to be considered not limitative.

Example I

In this experiment 39 grams (0.19 mole) of $$B_{10}H_{10}[C(H)C(COCl)]$$

in 50 ml. of diethyl ether was added slowly to 50 ml. (about 0.55 mole) of aniline dissolved in 100 ml. of diethyl ether and the two materials were allowed to react at 10° C. The reaction mixture was allowed to stand overnight at room temperature after which it was washed with water, dilute hydrochloric acid, and dilute sodium bicarbonate solution. The clear ether solution was then dried and the

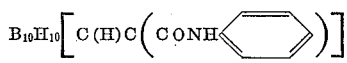

product was recovered from the dried ether solution by distilling off the ether. Some 46 grams of crude product was obtained by this method. In the next step the crude product was dissolved in 400 ml. of heptane at 75° C. and it was observed that a small amount of gum remained after the heptane had been added. The heptane was decanted and the solution allowed to cool. After evaporating off the heptane, there was obtained 37 grams of

M.P. 132°–133° C.

The aniline product so obtained was analyzed and the following results were obtained:

Calc'd for $B_{10}H_{17}C_9NO$: B, 41.2. Found: B,40.9, 41.0.

Example II

In this example 7 grams of aniline (0.075 mole) was reacted with 5.6 grams of $B_{10}H_{10}[C(H)C(COCl)]$ (0.027 mole) in diethyl ether. The reaction mixture was heated to reflux temperature and then it was allowed to cool to room temperature. In the next step the reaction mixture was washed with water, dilute hydrochloric acid and dilute sodium bicarbonate. The remaining clear ether solution was dried and, after removal of the ether by distillation, there was recovered 6.3 grams of the compound

which had a melting point of about 125° C. The crude product was recrystallized from benzene to obtain a pure material.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonum nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula

prepared as described in Examples I and II has the same structural formula I as that shown in the accompanying FIGURE 1 with the exception that the hydrogen atom indicated by the single asterisk is replaced by the radical

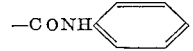

Reference is made to "Chemistry of the Hydrides," by Dallas T. Hurd, 1952, for a structural representation of the elementary decaborane molecule. The compound of the instant invention may be considered as structural derivatives of decaborane, but include in addition atoms of carbon, oxygen and nitrogen.

What is claimed is:

1. A compound of the formula:

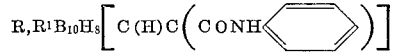

wherein R and R' are each selected from the group consisting of hydrogen and alkyl having from 1 to 5 carbon atoms.

2.

References Cited by the Examiner

UNITED STATES PATENTS

| | | | |
|---|---|---|---|
| 2,688,637 | 9/1954 | Coleman et al. | 260—562 |
| 3,093,646 | 6/1963 | Miller | 260—562 XR |

OTHER REFERENCES

Hurd: "An Introduction to the Chemistry of the Hydrides," pp. IV (figure opposite the title page) and 75, N.Y., Wiley, 1952.

WALTER A. MODANCE, *Primary Examiner.*

NICHOLAS S. RIZZO, *Examiner.*

R. PRICE, N. TROUSOF, *Assistant Examiners.*